E. SCHILL.
PROCESS OF OBTAINING LIQUID HYDROCARBONS.
APPLICATION FILED OCT. 10, 1912.
1,100,260. Patented June 16, 1914.
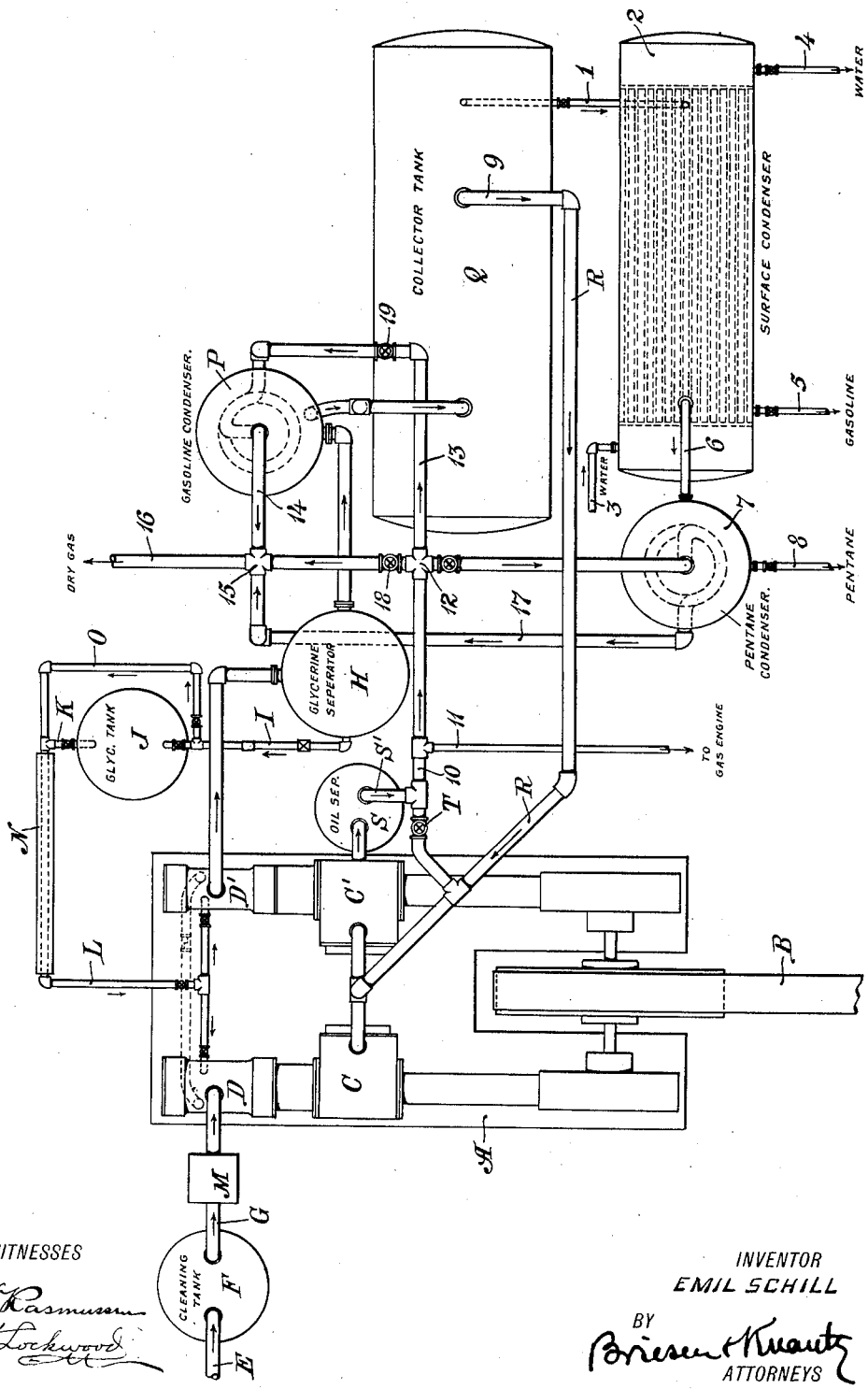
WITNESSES
INVENTOR
EMIL SCHILL
BY
ATTORNEYS

UNITED STATES PATENT OFFICE.

EMIL SCHILL, OF NEW YORK, N. Y., ASSIGNOR TO CONTINENTAL GAS COMPRESSING CORPORATION, OF NEW YORK, N. Y., A CORPORATION OF NEW YORK.

PROCESS OF OBTAINING LIQUID HYDROCARBONS.

1,100,260. Specification of Letters Patent. Patented June 16, 1914.

Application filed October 10, 1912. Serial No. 724,947. REISSUED

*To all whom it may concern:*

Be it known that I, EMIL SCHILL, a citizen of Wurttemberg, Germany, and a resident of New York city, New York, have invented certain new and useful Improvements in Processes of Obtaining Liquid Hydrocarbons, of which the following is a specification.

This invention relates more particularly to the recovery in isolated liquid form of hydrocarbons of the methane series, that is, hydrocarbons having a general formula of $C_nH_{2n+2}$. As typical of the process, I will refer in this specification throughout to the hydrocarbons pentane, $C_5H_{12}$, but it is understood that my process is equally applicable to the isolation and recovery of the adjacent hydrocarbons like hexane, etc.

The invention relates in its more specific form to the recovery in isolated form of such hydrocarbons of the methane series which have a boiling point between 0° and 70° C.

Several of the most important problems of modern industrial chemistry have been reduced to the question of obtaining pentane (or its homologues) in large quantities and at reasonable prices. These hydrocarbons are known chemical bodies existing in the form of various isomers, of which the iso variety is more particularly the object of this invention, but the known methods of production are attended with so much difficulty and expense as to practically make pentane or its homologues unknown bodies when considered as commercial commodities to be obtained in quantities and at prices that will make them available in connection with a large industrial enterprise.

The essence of my invention is based upon a series of observations, chief among which are the following: I determined first that in order to obtain pentane in large quantities I should discard any idea of a synthetic method of production as well as any idea of producing the product itself by chemical methods. Next in searching for pentane among natural existing products I find that it occurs in relatively large quantities in natural gas of the kind known as "wet gas." It also occurs in fair quantities in natural petroleum as a product directly contained therein. Having thus determined upon the nature of the starting material, I next eliminated and discarded various methods involving the direct extraction of pentanes out of the gases in the one case or the direct extraction or distillation of the pentanes from the petroleum, and decided to adopt an indirect method. Although such indirect method involves additional steps, I find that ultimately it is better than any direct method. In the case of the natural wet gas I first convert it, or rather such parts of it as contain hydrocarbons having a boiling point of from 0° C.–70° C. into the form of a liquid. Such liquid, if kept in a confined state, at pressures and temperatures which will prevent the volatilization of the hydrocarbons which have been liquefied, will contain among its ingredients pentanes and their homologues. Thereafter, provided the liquid is maintained in approximately the condition of its creation, the pentanes or their homologues can be separated by fractional distillation or by some special process. Such fractional distillation may, of course, be repeated several times, if desired, for the purpose of isolating the various hydrocarbons or their various isomers. Any hydrocarbon gases which are not liquefied under conditions specified may be used as fuel or for other commercial purposes, as may also be the liquid remaining after the extraction of the pentanes. In other words, the invention consists in its essence in a process according to which hydrocarbons, when found to have pentanes in admixture therewith, are first brought to or taken in the gaseous condition from which the pentanes or other desired homologues are not extracted directly, but are extracted by converting said gaseous mixture or a portion thereof into a liquid mixture and in then separating from the liquid mixture before a change in its condition takes place the desired homologue in the form of vapor and in finally converting it into an isolated liquid. Working on these general principles I have discovered that for the purpose of securing commercial results, there must be employed a more or less special means of converting the hydrocarbon gases into liquids. Refrigeration and other similar methods were discarded as impractical. I selected and applied a process according to which the hydrocarbon gases are treated under pressure with a finely divided heat absorbing medium. The agent should enter the compression cylinder in a finely atomized form such as a spray or mist. A pressure of 350 pounds to the inch in the cylinder is sufficient to bring about commercial results, but a lower pressure may also be used. At that pressure and at a temperature prevailing under those conditions the hydrocarbon gases still remain in their gaseous condition. The heat absorbing agent should also remove from the gases all the water contained in them in form of an aqueous vapor, and therewith all the water soluble impurities like $NH_3$, $H_2S$ and others, as well as heavier products like tar. It also absorbs the heat generated by compression. The agent is subsequently recovered while the compressed gases are passed through cooling chambers wherein they are converted into liquid form. The temperature in the cooling chambers is regulated in such a manner as to convert all the hydrocarbon ingredients with the exception of the so-called "permanent gases" to a liquid. We then have a liquid composed of hydrocarbons containing as some of its ingredients the pentanes in fair proportion. It is important that at this point the temperatures and pressures be so regulated that the liquid will be maintained at a temperature below that favorable to the evaporation of the pentanes. Any process which involves a further treatment of this liquid without maintaining such conditions or a process which involves the drawing off of such liquid into barrels or the like for storage and shipment whereby the liquid becomes subjected to ordinary atmospheric conditions, is unsuitable and useless for my purpose, inasmuch as for instance the isopentane having a boiling point of approximately 30° C. becomes volatilized and dissipated in the air and is thus irrecoverably lost. The hydrocarbons which have not become liquefied in the process above mentioned may pass out of the chamber containing the liquefied hydrocarbons and be subjected to further commercial use, but only under conditions which will insure the maintenance of the pentanes in liquid form. From this liquid mixture of hydrocarbons containing pentanes the pentanes may be distilled off by fractional distillation as may also the homologues of the pentanes which are present in liquid form. When, as the result of such distillation, the pentane isomers or their near homologues have been collected either in one vessel or separate vessels, in liquid form they are filled into metal tanks or cylinders and sealed to prevent volatilization.

In the case of natural petroleum which contains the pentanes, care must be taken not to permit the volatilization of the pentanes during their collection and further treatment. By heating such a petroleum say to 70° C., a certain variety of hydrocarbons including pentanes are driven off and passed through the above described compression treatment until they become liquefied, however with liquid mixtures of this character the volatilization of the low boiling ingredients is retarded and the temperature may be advantageously increased, to secure a more nearly quantitative yield. The liquid so obtained consisting substantially of pentanes, but containing a proportion of its nearest homologues, may be filled in steel cylinders directly and sealed or they may be further isolated by fractional distillation or otherwise, as above described.

I have employed a number of heat absorbing agents all of which have—as they must—the quality of absorbing water, of being good conductors of heat, of having lubricating qualities, the property of chemical neutrality with respect to any of the products under treatment as well as with respect to the machinery and of constancy in chemical respects even at high temperatures. They should have also a high specific heat, a high specific weight and a high boiling point, and the capacity of being readily separated from water so that they may be used over and over again. I have used with good results commercial glucose, Turkey red oil, glycerin, trimethylene glycol. There may be other agents having the above described qualities and equally suitable for my purpose.

For the purpose of illustrating the apparatus in which the process of this application may be carried out, I submit herewith a schematic drawing.

The figure shows a top view of the plant.

In the drawing A represents the compressor, and B the belt that drives it.

C C' are the steam cylinders each of which communicates with the compression cylinders D D'.

E represents the pipe communicating with the source of supply, for example, the head of an oil well or of a storage tank or a pipe line.

The drawing will be further described with respect to the fluid to be operated upon in the form of a gas at the point where it enters the tank F with which the pipe E communicates. The tank F is a cleaning tank, the gases entering said tank through the pipe E at the top of the tank F depositing rust, oils, water, etc., such as are readily separated by gravity. The gases thus comparatively purified pass out from the tank F through the pipe G which communicates with the upper part of the tank F. They pass through the meter M, the function of which is to measure the quantity of gases which are compressed. The gases enter the low pressure cylinder D. The compressed gases are conveyed, by means of the connection shown in dotted lines, to the high pressure cylinder D', this connection being preferably located below the apparatus shown. In the high pressure cylinder D' the gases are subjected to that degree of pressure which is required to reduce them to the proper condition for treatment in the further processes of the apparatus and also to give them the necessary power to pass through the remaining portions of the apparatus. From the high compression cylinder D' the compressed gases are brought into the top of the separator H in which the glycerin is recovered. The pipe I connects the bottom of the separator H with the top of the glycerin tank J. The pressure in the separator H is sufficient to raise the liquid in the pipe I. From the bottom of the storage tank J the glycerin is carried through the pipes K—L to the spraying nozzles through which it is injected into each of the compression cylinders in a very finely divided condition. The pipe L during a portion of its length is shown as externally cooled by the double pipe water cooler N. The by-pass O is used when the storage tank J is cut out of the system for purposes of cleaning, refilling, replacing or repair. From the upper part of the separator H the compressed hydrocarbons pass into the coil condenser P which may be cooled by the expanded gases in the manner which will be described later. The object of the condenser P is to liquefy the major portion of the hydrocarbon gases. The condensates and unliquefied gases pass through the pipe marked with an arrow from the bottom of the condenser P into the top of the collecting tank Q. The dry uncondensed gases are forced through the pipe R into the compound steam cylinders C C', where such pressure as they may be under will be converted into work. These gases as they leave the compound cylinders C C' expand into the separator S where such oils or lubricants as they may have gathered will be removed from them. The expansion of these gases at this point following the conversion of their pressure into energy develops a very material reduction in temperature. The cooled gases leave the seperator S through the pipe S' and from this point forward there is again a divergence between the specific manner in which the cooling qualities of the gases are reëmployed in the system. The relief valve T may be used in starting the apparatus so that the gas engine shall not work against the load. The relief valve T is closed as soon as the pressure is properly developed.

To return to that stage of the process in which the condensed gases are gathered in the collecting tank Q; the liquid leaves the bottom of that tank through pipe 1 through which it is carried into the condenser 2. The condenser 2 is arranged as a surface condenser being supplied with hot water through the pipe 3 which leaves the condenser at 4. The temperature of the water is so regulated that the liquid shall be heated to the desired temperature, say 60° C. The liquid or gasolene which is not vaporized in the condenser 2 is withdrawn through the pipe 5. The gases which are vaporized by this treatment in the condenser 2 leaves the condenser through the pipe 6 and pass into the top of the coil condenser 7. The gases condensed in the coil condenser 7 leave through the pipe 8 at the bottom of the coil condenser and from the pipe 8 the liquid is directly collected in steel cylinders or tanks in a well known manner and under conditions which exclude the admittance of atmospheric air or pressure. The cooling temperature required in the condenser 7, which for convenience may be designated as the pentane condenser, as well as that required for the coil condenser P, which may be called the gasolene condenser is supplied by the system itself in the following manner: The uncondensed dry gases still under the pressure imparted to the system leave the collecting tank Q through the pipe 9 which communicates with the pipe R and thus through the compound cylinders C C' and the oil separator S. As above described the gases leave the separator S passing into the pipe 10, being now extremely cold and a part of this gas may be conveyed through the pipe 11 to the gas engine which drives the belt B. The cold gases otherwise flow onward through the pipe 10 to the cross-T 12. The gas is divided and a part of it passes into the top of the pentane condenser 7. The balance of the cooled gas is conveyed by means of the pipe 13 into the bottom of the gasolene condenser P leaving the same at the top through pipe 14 into the cross-T 15 from which they emerge from the system through the pipe 16. In the cross-T 15 these cold gases coming from the gasolene condenser P are joined by the cold gases which leave the bottom of the pentane condenser 7 through the pipe 17. The valves 18 and 19 are provided so as to permit the withdrawal of the cold gases from the system without causing them to pass through the gasolene condenser or to permit the regulation of the temperature in the gasolene condenser. The cold gases that leave the system at 16 may be again metered and employed for industrial purposes especially where they contain very volatile noncondensable constituents such as methane.

It will be seen from the above description that my process requires the following essentail features: A certain set of hydrocarbons must first be procured in the form of or reduced to gaseous condition. It must then be subjected to compression in the presence of a special heat absorbing agent such as hereinabove described. It must then be, while in the compressed condition, brought to liquid form by a reduction of the temperature. This liquefaction must take place at temperatures and pressures closely approximating those at which the pentanes are volatilized. Before these pressures or temperatures are permitted to become normal or atmospheric, the pentanes are liberated in gaseous form from the vessel containing the liquid and subjected to a special treatment selected for each member.

In my claims I use the word pentane as typical of the homologues of the pentanes, all of which I intend to include within the scope of the protection desired.

What I claim is:

1. The process of separating the pentanes from a volatilized mixture of hydrocarbons which comprises subjecting such mixture to pressure in the presence of a finely divided heat absorbing agent, liquefying such of the compressed gases as normally volatilize at temperatures above approximately 25° C., maintaining in the liquid thus produced the condition of its creation, distilling the pentanes from said liquid, liquefying same and storing same under seal.

2. The process which consists in securing a mixture of hydrocarbons in the form of gas, containing as one of its constituents the pentanes, confining said gas and in its confined state subjecting it to pressure in the presence of a finely divided heat absorbing agent and to reduction in temperature until such of the hydrocarbons as normally volatilize above 25° C. are reduced to liquid form, maintaining said liquid in the confined state, and separating therefrom, while confined, by suitably adjusting the temperatures and pressures, the specific hydrocarbons which it is desired to isolate.

3. The process which consists in securing a mixture of hydrocarbons in the form of gas, containing as one of its constituents the pentanes, confining said gas and in its confined state subjecting it to pressure in the presence of a finely divided heat absorbing agent and to reduction in temperature until such of the hydrocarbons as normally volatilize above 25° C. are reduced to liquid form, withdrawing the unliquefied gases, separating in the form of gas from the liquid while confined by suitably adjusting temperatures and pressures, the specific hydrocarbons to be isolated, separately from said unliquefied gases and collecting them in liquid form under seal, and separately storing the residual liquid.

4. A method of obtaining from a gaseous mixture comprising hydrocarbons of "low," "medium," and "high" boiling points, that ingredient having the "medium" boiling point, which comprises compressing the gas mixture, in the presence of a heat absorbing medium, then cooling sufficiently to liquefy the portions having the "medium" and the "high" boiling points, separating the liquefied portion from the gaseous portion, conveying said liquefied portion while still under pressure and without allowing alteration of its composition, to a still, and fractionally distilling the same to obtain said portion having the "medium" boiling point separately from that portion having the "high" boiling point, and from that portion having the "low" boiling point.

5. A method of obtaining, in isolated condition, the pentanes from a gaseous mixture comprising pentanes and hydrocarbons of lower boiling points than pentane, and hydrocarbons of high boiling points than pentane, which comprises compressing said gas mixture, in the presence of a finely divided heat absorbing medium, then cooling the gas mixture sufficiently to liquefy the pentanes, and the ingredients of the gas mixture having higher boiling points than the pentanes, separating the liquid portion from the gaseous portion, conveying said liquefied portion, while still under pressure, and without allowing evaporation of said pentanes, to a still, fractionally distilling the pentanes therefrom, in a concentrated condition, and out of contact with said ingredients having lower boiling points than said pentanes.

6. A method of obtaining a hydrocarbon of the methane series in the isolated condition, from a mixture of said hydrocarbon with other ingredients respectively more readily and less readily volatile; said process comprising the steps of separating in liquid form, the hydrocarbon desired, in admixture with at least some of the ingredients of higher boiling points, subjecting said liquid, in its unaltered condition to fractional distillation to separate said hydrocarbon from said ingredients having higher boiling point, in relatively concentrated condition, and collecting the same, while avoiding mixing of said hydrocarbon with the uncondensed gases.

7. The method of obtaining in a continuous process three isolated separated ingredients of the methane series, which comprises compressing mixed hydrocarbon gases of said series in the presence of a finely divided heat-absorbing medium, withdrawing the heat absorbing medium from the compressed mixed gases while maintaining the pressure on said gases, condensing out of such mixed compressed gases predetermined fractions thereof, one of which consists of gasolene and another of hydrocarbons of the pentane class, by the separate action, upon the pentane while in the form of a separated gas and upon the mixed compressed gases while still in the form of gas, of a third ingredient, methane, the said third ingredient being cooled by expansion from the pressure of the initial compression, prior to its condensing action on subsequent volumes of the mixed compressed gases and after the volume of gasolene and pentane initially compressed with it have been reduced to liquid form, separately collecting and withdrawing the thus condensed first two named ingredients in liquid form and the third ingredient in the form of an expanded gas.

8. A method of obtaining pentanes from "wet" natural gas, which comprises highly compressing said gas, in the presence of a finely divided heat absorbing agent, said agent having the properties of being an absorbent for water, being a good conductor of heat, having good lubricating properties, being inert, toward the constituents of said natural gas, and toward the parts of the machinery, having high specific heat, high specific weight, and high boiling point; then cooling said compressed gases sufficiently to liquefy the pentanes and less volatile materials, subjecting said liquid, in its unaltered condition to a temperature sufficient to vaporize the pentanes, and collecting said pentanes in a concentrated condition.

In testimony whereof, I have hereunto set my hand in the presence of two subscribing witnesses.

EMIL SCHILL.

Witnesses:
 FRANK F. KIRKPATRICK,
 JOHN A. KEHLENBECK.